United States Patent
Ballegeer

(10) Patent No.: US 11,536,472 B2
(45) Date of Patent: Dec. 27, 2022

(54) CONCENTRIC PIPE GEOTHERMAL HEAT EXCHANGER WELL HEAD

(71) Applicant: John P. Ballegeer, Littleton, CO (US)

(72) Inventor: John P. Ballegeer, Littleton, CO (US)

( * ) Notice: Subject to any disclaimer, the term of this patent is extended or adjusted under 35 U.S.C. 154(b) by 360 days.

(21) Appl. No.: 16/519,325

(22) Filed: Jul. 23, 2019

(65) Prior Publication Data

US 2020/0033014 A1    Jan. 30, 2020

Related U.S. Application Data

(60) Provisional application No. 62/711,732, filed on Jul. 30, 2018.

(51) Int. Cl.
| | |
|---|---|
| *F24F 5/00* | (2006.01) |
| *F24T 10/10* | (2018.01) |
| *F25B 30/06* | (2006.01) |

(52) U.S. Cl.
CPC ............ *F24F 5/0046* (2013.01); *F24T 10/10* (2018.05); *F25B 30/06* (2013.01); *F24F 2005/0057* (2013.01)

(58) Field of Classification Search
CPC ...... F24F 5/0046; F28D 7/10; F28D 20/0052; F16L 39/005; F16L 9/18; F24T 10/10; F24T 10/17
USPC ................ 165/45; 285/123.1, 123.3, 123.15; 138/114
See application file for complete search history.

(56) References Cited

U.S. PATENT DOCUMENTS

| | | | | |
|---|---|---|---|---|
| 4,059,146 A | * | 11/1977 | Gruniger ................. | F24S 10/70 165/45 |
| 4,328,858 A | * | 5/1982 | Richter .................... | F24T 10/17 165/142 |
| 4,574,875 A | * | 3/1986 | Rawlings ............. | F28D 20/0052 165/142 |
| 4,852,914 A | * | 8/1989 | Lyall ....................... | B29C 65/20 285/21.2 |
| 5,181,655 A | * | 1/1993 | Bruckelmyer ............ | E02D 3/11 165/45 |
| 5,339,890 A | * | 8/1994 | Rawlings ................ | F25B 30/06 165/45 |
| 5,533,355 A | * | 7/1996 | Rawlings ................ | E21B 23/00 62/260 |
| 6,451,200 B1 | | 9/2002 | Lussier et al. | |

(Continued)

OTHER PUBLICATIONS

Alternative Energy Group, Inc., Ground Source Heat Pump, discussion forum, Jul. 2009, 2 pages.

(Continued)

*Primary Examiner* — Jianying C Atkisson
*Assistant Examiner* — For K Ling
(74) *Attorney, Agent, or Firm* — FisherBroyles, LLP; Craig W. Mueller

(57) ABSTRACT

A concentric pipe geothermal heat exchanger well head is described. The well head may include a riser pipe having an outer pipe and an inner core pipe, wherein an inner heat exchanger pipe is coupled to the inner core pipe, a reducer coupled to an outer heat exchanger pipe on one side and coupled to the outer pipe on a second opposite side to conduct fluid between the outer heat exchanger pipe and the outer pipe, a flow pipe parallel to and biaxial with the riser pipe configured to be coupled to a geothermal heat pump, and an elbow coupled to the outer pipe to couple fluid between the outer pipe and the well head pipe.

7 Claims, 8 Drawing Sheets

(56) References Cited

U.S. PATENT DOCUMENTS

| | | | |
|---|---|---|---|
| 6,502,636 B2 | 1/2003 | Chatterji et al. | |
| 7,438,501 B2* | 10/2008 | Sopko | E02D 3/115 |
| | | | 165/45 |
| 7,938,904 B1* | 5/2011 | Wiggs | F24T 10/10 |
| | | | 106/713 |
| 8,511,368 B2 | 8/2013 | Hardin et al. | |
| 10,203,162 B2 | 2/2019 | Yokomine et al. | |
| 2005/0061472 A1* | 3/2005 | Guynn | F24T 10/15 |
| | | | 165/45 |
| 2007/0023163 A1* | 2/2007 | Kidwell | F28F 13/12 |
| | | | 165/45 |
| 2010/0218912 A1 | 9/2010 | Lawless et al. | |
| 2011/0163534 A1* | 7/2011 | Biel | F24S 60/30 |
| | | | 285/123.1 |
| 2011/0259547 A1 | 10/2011 | Kidwell et al. | |
| 2012/0175077 A1 | 7/2012 | Lehmann et al. | |
| 2013/0087306 A1* | 4/2013 | Winn, Jr. | F24T 10/17 |
| | | | 165/45 |
| 2013/0133855 A1* | 5/2013 | Kim | F28D 7/103 |
| | | | 165/41 |
| 2014/0299291 A1 | 10/2014 | Stewart et al. | |
| 2015/0316294 A1* | 11/2015 | Andersson | F28D 20/0052 |
| | | | 165/45 |

OTHER PUBLICATIONS

Glenn Meyers, "Green Building 101: Tapping into Geothermal Riches," website article, Mar. 23, 2011, 6 pages.

Henk Witte, "The GEOTHEX geothermal heat exchanger, characterisation of a novel high efficiency heat exchanger design," paper, Innostock 2012, The 12th International Conference on Energy Storage, 2012, 10 pages.

Amasond GmbH, Machinery, Company Overview of Amasond GmbH, Snapshot, Bloomberg, 1 page.

Amasond USA, Forums, Green Building Technologies, Geothermal Heat Pumps, Mar. 2013, 3 pages.

Jasmin Raymond, et al., "Designing coaxial ground heat exchangers with a thermally enhanced outer pipe," Research Article, Geothermal Energy, published online Apr. 8, 2015, 14 pages.

Jean-Sebastien Gosselin, et al., "Nanocomposite Materials Used for Ground Heat Exchanger Pipes," research paper, IGSHPA Conference & Expo, 2017, pp. 373-383.

Francesco Tinti, et al., "Ground temperature monitoring for a coaxial geothermal heat exchangers field: practical aspects and main issues from the first year of measurements," The Mining-Geology-Petroleum Engineering Bulletin, scientific paper, 2018, pp. 47-57.

\* cited by examiner

CONCENTRIC PIPE GEOTHERMAL HEAT EXCHANGER WELL HEAD

CROSS-REFERENCE TO RELATED APPLICATIONS

This application claims the benefit of U.S. Provisional Application No. 62/711,732 filed Jul. 30, 2018, entitled Concentric Loop Geothermal Heat Transfer System which is hereby incorporated fully by reference herein.

FIELD

The present description relates to borehole geothermal heat exchangers and, in particular, to well heads, supply, and return lines for such heat exchangers.

BACKGROUND

Efficiency is desired in geothermal heat pump (GHP) heating and cooling applications. There are a variety of systems designed to facilitate heat transfer by using ground heat exchangers (GHEX). One configuration of a GHEX system incorporates a "U" shaped bend in its design. In such a configuration, a single, small diameter, pipe is installed in a vertical borehole with a U-shaped bend in the bottom of the borehole that forms a vertically-bored, closed loop, U-pipe GHEX system. As a heat exchange fluid flows out from the GHP through the GHEX system, heat is exchanged between the fluid and the surrounding ground mass. The heat exchange fluid then flows back to the GHP to facilitate the heating or cooling of air flowing through a heating, ventilation and air conditioning (HVAC) system. In a typical U-pipe GHEX installation, within the single U-shaped pipe, a fluid flows outward from the GHP through the supply or outward flow portion of the pipe until it hits the U-shape, at which point the fluid returns to the GHP through a parallel return flow portion of the pipe. In typical vertical installations, the outward supply flow portion of the pipe is laid close to the return flow portion of the pipe, often as close as merely one inch (2.5 cm) apart.

In some U-pipe systems, the diameter of the parallel supply and return flow portions of the pipe are the same, resulting in the same fluid flow rate both through supply and return portions of the pipe. As a result, much of the desired heat exchange that occurs between the fluid traveling through the supply flow portion of the pipe and the ground is cancelled by an undesired heat exchange that occurs between the fluid traveling through the supply flow portion of the pipe and the return flow portion of the pipe. Therefore, in U-shaped geothermal heat exchange systems, heat is transferred in an inefficient, undesired fashion between the fluid travelling through the supply flow and return flow portions of the pipe. Moreover, to install large supply and return flow pipes placed farther apart would require the costly endeavor of drilling a larger borehole.

Rising energy costs pose a challenge that a more efficient geothermal system can better solve. Effectively deploying, efficient, combined geothermal-solar systems, where solar electricity and new battery technology powers the GHP, can lead to minimized heating and cooling costs. Moreover, such combined systems can reduce or even eliminate persistent problems associated with pollution emitted by combustion of carbon fuels to generate heat or electricity.

BRIEF DESCRIPTION OF THE DRAWING FIGURES

The invention may be understood by referring to the following description and accompanying drawings that are used to illustrate embodiments of the invention.

DETAILED DESCRIPTION

Figure 1:
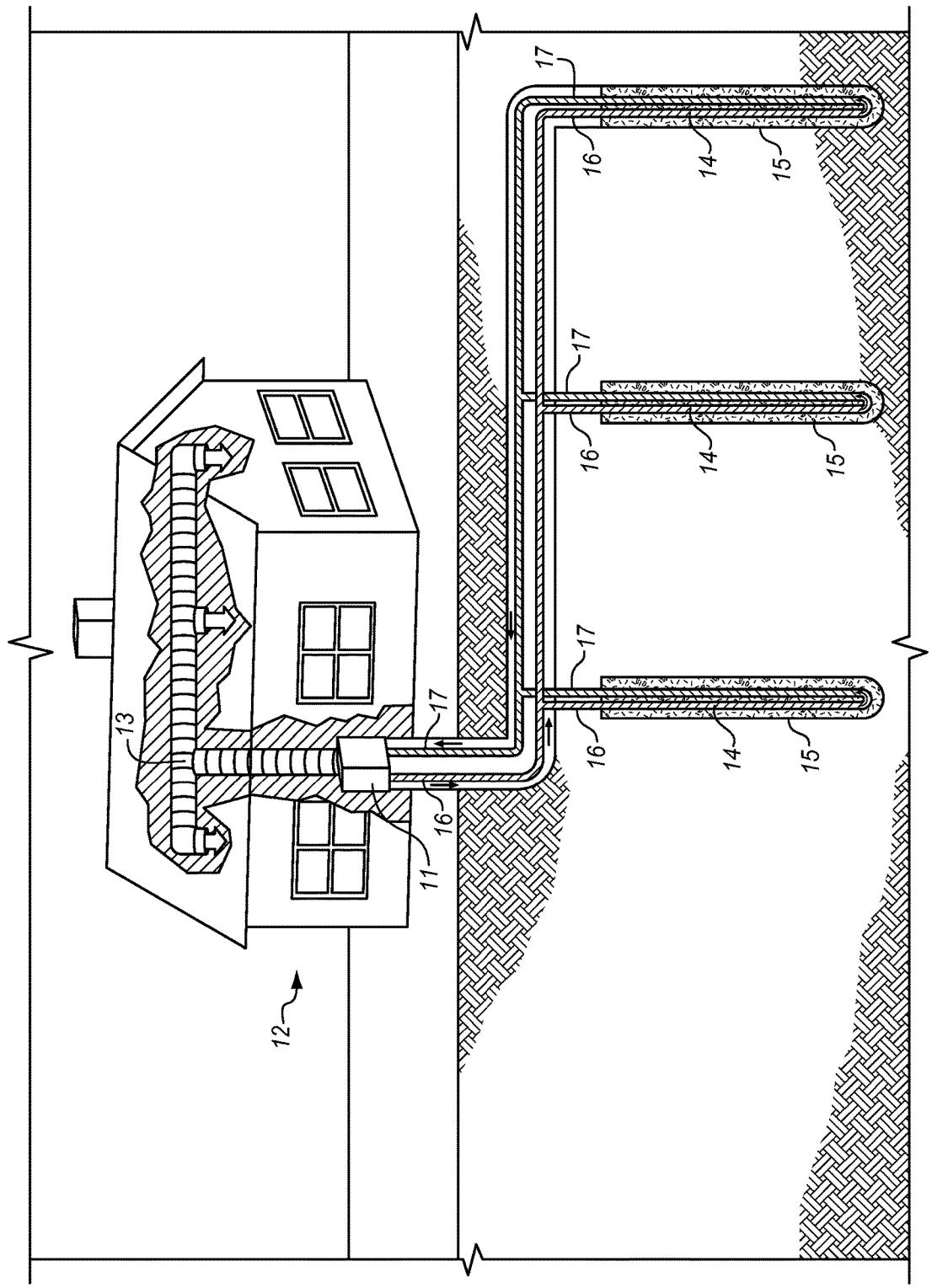
FIG. 1 is a schematic front elevation view diagram, partially cut-away, of a prior art U-pipe configuration in a vertical borehole, geothermal heat pump system.

A GHEX configuration as depicted in FIG. 1, includes a geothermal heat pump (GHP) 11 located within a building 12 and coupled to the building HVAC system 13. The heat pump is supplied by three vertically bored, closed loop, U-pipe ground heat exchangers (GHEX) 14. The ground heat exchangers consist of a U-shaped loop of small diameter pipe placed in a grout filled borehole 15. Heat exchange occurs when a heat exchange solution is pumped from the heat pump 11 outward and down a supply pipe of the U-shaped loop for supply flow 16 into the U-pipe GHEX 14 in a grout filled borehole 15. The solution reaches the U-shaped bend at the bottom of the GHEX and then returns to the heat pump along a parallel return flow 17 pipe. The heat pump then uses the heat exchange solution 16, 17 to heat and cool the building. Ground heat exchangers using the parallel, U-shaped loop configuration, require boreholes 15 that are as much as 400 feet deep.

Figure 3:
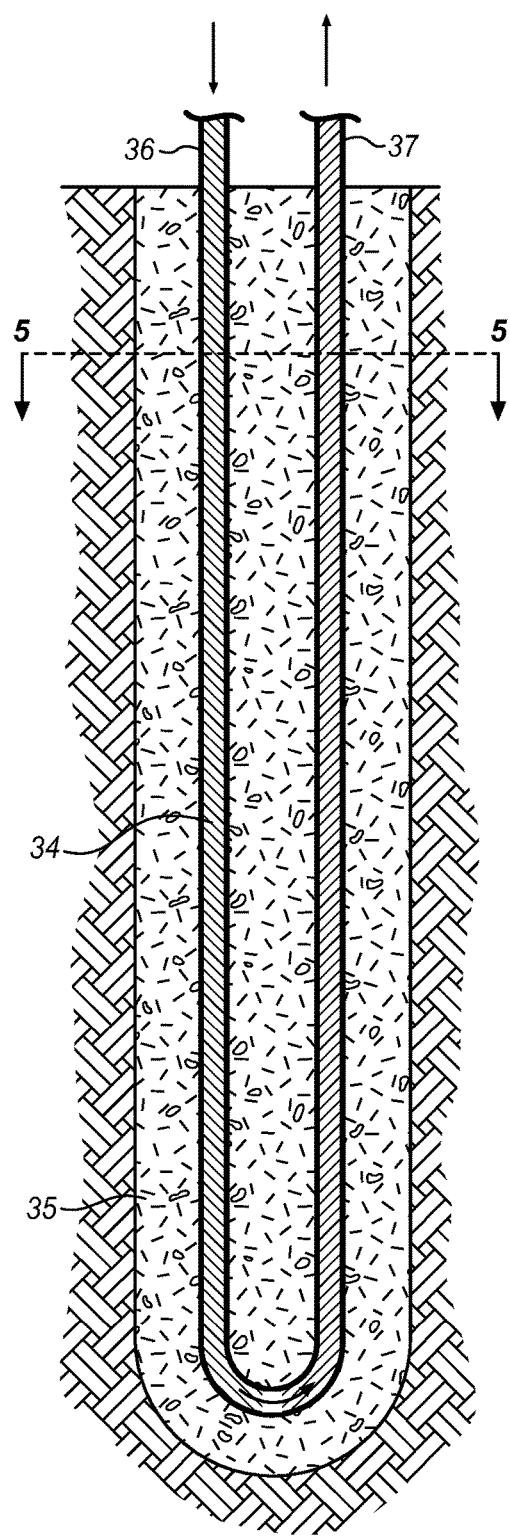
FIG. 3 is a schematic longitudinal cross-section view diagram of the U-pipe configuration for a vertical borehole as shown in FIG. 1.
Figure 5:
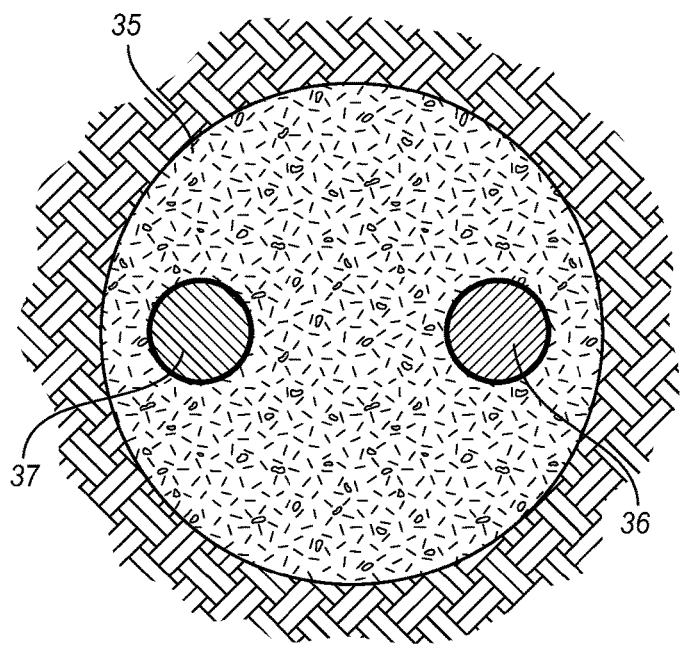
FIG. 5 is a cross-section view diagram of the U-pipe configuration of FIG. 3 taken along line 5-5.

The surface area along the exterior of the small diameter pipes in the U-Shaped GHEX is very small, resulting in a contact area, a contact time, and a volume of heat exchange fluid that are all minimized FIG. 3 shows a parallel U-shaped loop, where the supply or outward flow and return flow travel in small diameter, parallel supply 36 and return 37 pipes, placed close together in a grout filled borehole 35. FIG. 5 depicts a configuration of a cross-section along line 5-5 of the parallel U-shaped loop 34 featuring the two parallel, small diameter, supply 36 and return 37 flow pipes placed in close proximity in a grout filled borehole 35.

The borehole length determines the amount of thermal exchange in the loop. A length requirement is often associated with the inefficiencies associated with the U-shaped design, requiring a longer fluid contact time between the pipe and surrounding earth surface. Current geothermal systems can require a borehole with a length of two hundred to three hundred feet (61 m-92 m) or more in order to provide adequate heat exchange to operate the GHP. The risk of difficult or changing ground conditions increases with increasing borehole depths. Deeper wells increase the chance of encountering problems association with borehole conditions, such as caving, whereby the hole closes in or other undesirable scenarios that can arise, making deeper wells more difficult and more expensive.

For non-vertical boreholes, such lengths of two hundred to three hundred feet often exceed the boundaries of property plots, making installation impractical, or only available with the permission of owners of surrounding plots of property. Moreover, such long and/or deep boreholes require larger drilling rigs and specialized equipment that take up a large surface area of land, which is often impractical in typical lot configurations. A recognized advantage associated with a shallower well is that by penetrating a smaller geologic section, there will likely be fewer undesirable and/or unpredictable changes in ground conditions. The space and lot size requirements for deep borehole systems are large, making their installation and usage impractical in a great many scenarios, such as retrofitting existing homes and businesses.

Separately, the size of the pipe used with conventional geothermal heat exchange systems is undesirably small, in correlation with the increased price associated with drilling larger boreholes deeper into the earth. Smaller pipes, configured as such to fit within more economically efficient smaller-diameter boreholes, are generally less efficient at exchanging heat with the externally surrounding earth. In the same vein, to achieve the same heat exchange capacity of a larger diameter pipe size, one must drill to approximately twice the depth to gain the same amount of heat exchange. Moreover, with deeper borehole depth requirements, a larger work area is required to facilitate more space-intensive drilling equipment requirements. This is often infeasible for lots of limited dimensions.

Metallic components in a GHEX construction, lead to increased materials costs, installation costs, and maintenance expenses as compared to non-metallic materials. Due to corrosion and other elemental considerations, metallic components cannot be buried for legal and/or maintenance reasons and generally require a utility box. Utility boxes are generally undesirable because they can take up valuable space on limited lots, or pose as an undesirable obstacle.

Non-metallic components such as high-density polyethylene (HDPE) are desirable in GHEX applications because of their durability and corrosion resistance. However, a variety of challenges associated with the use of HDPE remain. For instance, connecting HDPE components in a specialized configuration remains difficult. To achieve specialized configurations, HDPE is often connected to other components using some form of metallic and/or mechanical connection, which presents challenges associated with corrosion, maintenance, and long term performance.

Figure 2:
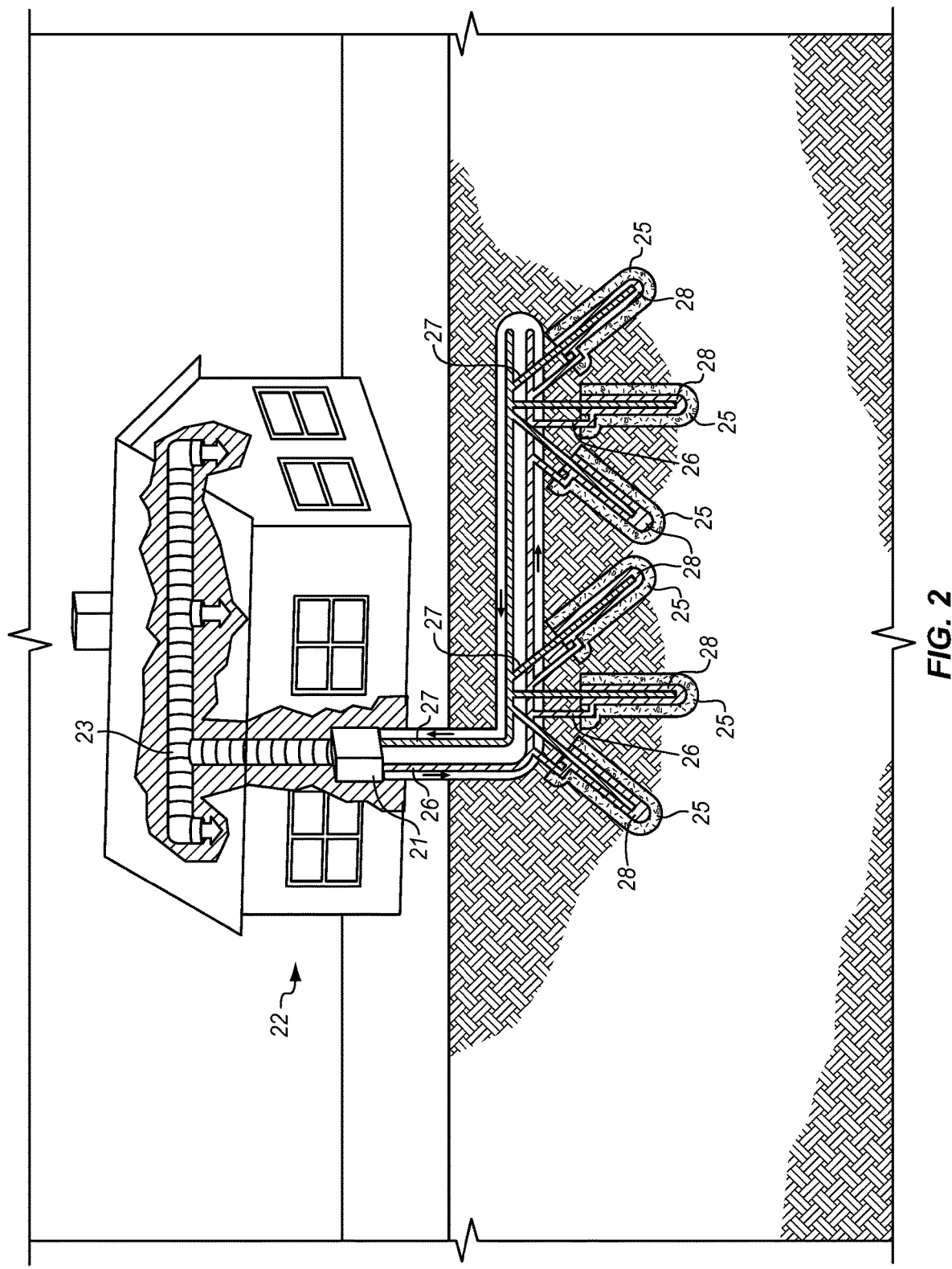
FIG. 2 is a schematic front elevation view diagram, partially cut-away, of a concentric pipe configuration with a shallower and angled borehole, geothermal heat pump system.

FIG. 2 shows a concentric pipe or coaxial GHEX configuration 28. In this configuration, the GHEX consists of a smaller diameter inner pipe placed within a larger diameter outer pipe. The supplied heat exchange fluid 26 flows down the annular area between the inner and outer pipes and the return heat exchange fluid 27 flows back up the inside of the inner pipe. In some configurations the direction of flow may be reversed so that the inner pipe is the supply pipe and the outer pipe is the return pipe. This concentric pipe GHEX installation includes a GHP 21 within the building 22 connected to (Heating, Ventilation, and Air-Conditioning) HVAC system 23. The heat pump is supplied by two arrays of three angled bored, closed-loop, concentric pipe GHEX systems 28 in respective grout filled boreholes 25.

Figure 4:
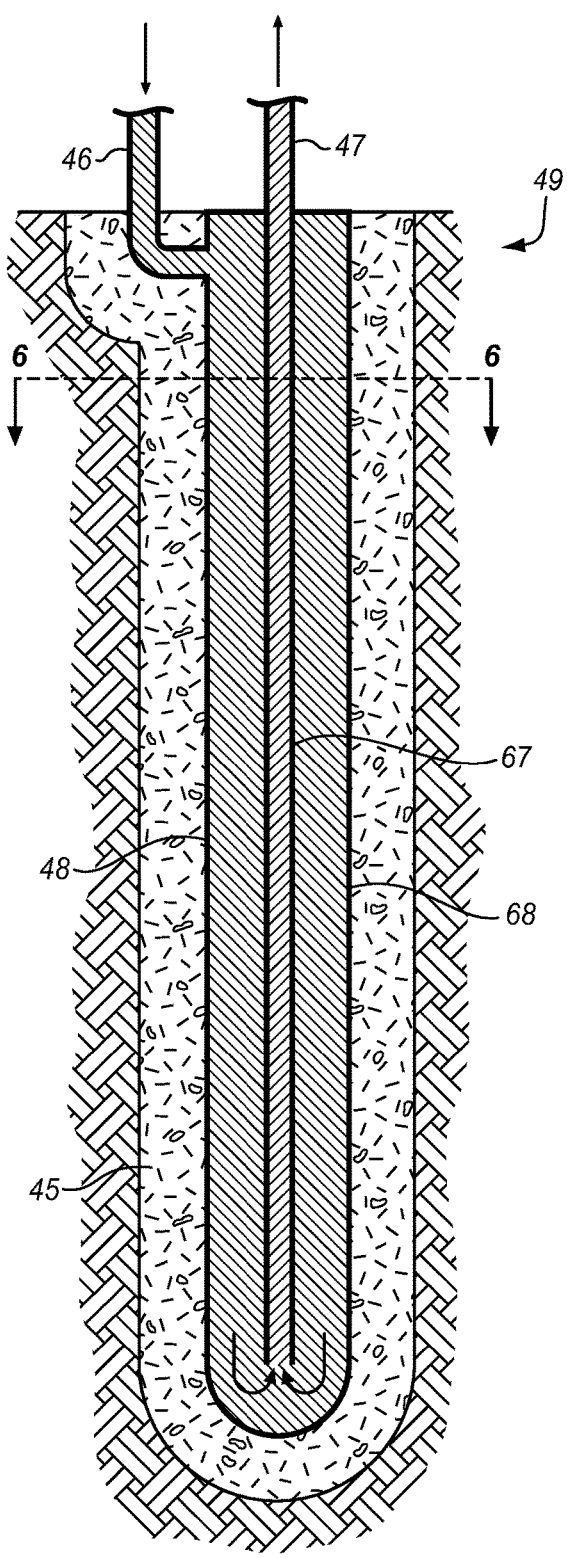
FIG. 4 is a schematic longitudinal cross-section view diagram of the concentric pipe configuration for a borehole as shown in FIG. 2.
Figure 6:
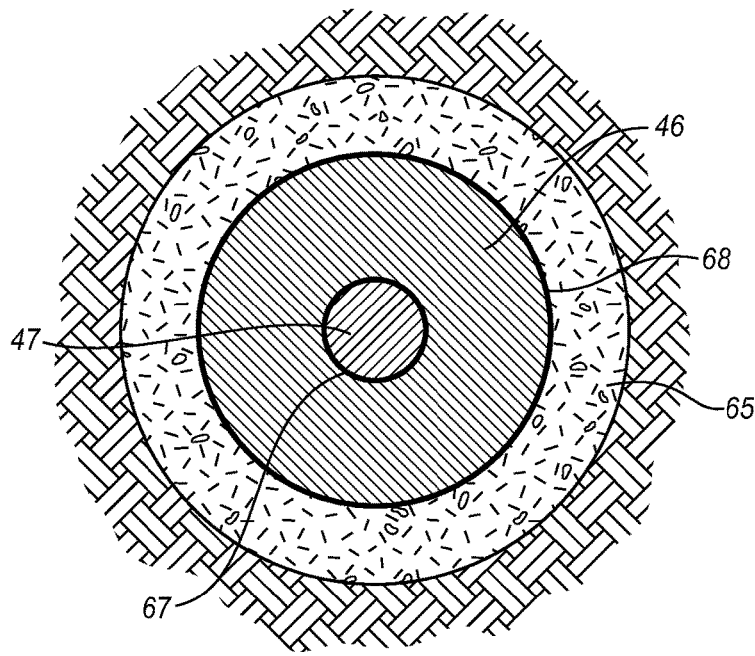
FIG. 6 is a cross-section view diagram of the concentric pipe configuration of FIG. 4 taken along line 6-6.

FIG. 4 illustrates a cut-away section of a concentric pipe GHEX installed in a grout filled borehole 45, where the supply flow 46 travels down the annular area between the inner 67 and outer 68 pipes and the return flow 47 travels up the inner pipe 67. FIG. 6 illustrates a cross-section of the concentric pipe GHEX taken along line 6-6 showing the concentric pipe supply 46 and return 47 flow areas in a grout filled borehole 65.

The concentric pipe GHEX system has a greater GHEX surface area in contact with the earth, stemming from a larger diameter outer pipe, which provides more efficient heat exchange. Likewise, a longer contact time between the heat exchange fluid and the earth, stemming from a larger diameter of pipe and greater volume of heat exchange fluid provides more efficient heat exchange. This increased efficiency allows the concentric pipe GHEX system to be installed in a borehole drilled to a much shallower depth than is required for the conventional U-pipe GHEX system. The reduction in borehole lengths possible for a concentric pipe GHEX systems, compared to the U-pipe configuration, is on the order of 40-50%, which makes a concentric pipe GHEX/GHP system more economical than the U-pipe GHEX/GHP system.

The deeper borehole requirements for a U-pipe GHEX system also require a larger work area to facilitate larger, more space-intensive, drilling and excavation equipment, which often becomes infeasible for retrofit projects, where access is limited or required space is constrained by building lots having limited dimensions. Additionally, the shallower boreholes allowed by the concentric pipe GHEX system facilitate the use of angled boreholes as shown in FIG. 2, further increasing flexibility in the GHEX layout by reducing equipment access and working areas, trench excavation areas, and site disturbance areas.

As shown in FIG. 4, a concentric pipe GHEX configuration 48 has a different component or assemblage of fittings at the top of the GHEX that provides for transition of the heat exchange fluid flow from the separate parallel GHP supply 46 and return 47 lines to the central and annular flow areas in the GHEX. The top fittings and surrounding structure have been called a well head 49, well cap, top cap, splitter cap, top manifold, supply and return header, or fluid and return injection manifold.

The well head described herein may be assembled on-site and connected on one side to the concentric pipe and on the other side to pipes to the GHP. Current well heads that involve the use of metallic, dissimilar, or non-polyethylene materials; joining methods that involve welding, gluing, or chemically fusing connections; and threaded, bolted, clamped, or other mechanical-type connections. Some of these joining methods require specialized skills or equipment which may not be readily available. In addition, some current standards require that the underground portion of the GHEX should be polyethylene or cross-linked polyethylene and that any buried polyethylene pipe systems be joined by a heat fusion process or by stab-type fittings that are quality controlled to provide a leak-free union between pipe ends that is stronger than the pipe itself.

For maintenance, safety, and inspection purposes the well head parts may be made accessible after installation and need not be buried underground. When other materials or joining methods are used, then a below-ground chamber is dug to provide access, but this adds to the installation costs.

Embodiments of a well head are described herein that provide for fluid flow along a large diameter, concentric pipe configuration, ground heat exchanger. Embodiments of the well head may be made entirely of high-density polyethylene, allowing field assembly using joining methods that satisfy current design and installation standards for complete underground burial. The well heads may use a segment of reduced diameter, more flexible, riser pipe between the well head and the full diameter ground heat exchanger that facilitates offsetting the supply and return connections along the riser pipe, allowing the well head to be placed within the same diameter borehole as is drilled for installation of the ground heat exchanger.

Such well head embodiments allow the borehole to be drilled along any angle in the subsurface, improving access for retrofit projects having site constraints and reducing overall site disturbance. This well head allows a completely subterranean concentric pipe ground heat exchanger system that can replace a U-pipe ground heat exchanger system. By improving the thermal efficiency and economy of these geothermal heat pump systems and making them a more economically viable alternative, this wellhead and concentric pipe heat exchanger can reduce the carbon footprint associated with hydrocarbon or fossil-fuel based heating, ventilation, and air conditioning installations A concentric pipe geothermal system functions by flow of the heat exchange solution through coaxial pipes in a concentric configuration that reduces the required length of pipe and the required depth of borehole. In some embodiments a thermally-fused, specially configured assembly of concentric pipes is arranged such that a larger volume of slower moving, outward flowing, heat exchange fluid travels out of the GHP and along the annulus or the outer region of the concentric pipe having the largest surface area nearest the surrounding earth. At the bottom of the borehole, a faster moving heat exchange fluid returns to the GHP more quickly through a smaller diameter inner core pipe contained within.

As mentioned, a concentric pipe GHEX system has a supply or annular flow area 26, 46 as shown in FIGS. 2, 4, and 6. An embodiment of the supply flow area 46, as shown in FIG. 6, is the annular space between the outer pipe 68 and the inner core pipe 67 and may have the following nominal dimensions: four (4) inch diameter outer pipe and one (1) inch diameter inner core pipe. This provides an annular flow area of about 12.2 square inches between the outer pipe 68 and inner pipe 67, which is about 12.3 times greater than the 0.88 square inch flow area for the inner pipe 67. For a unit length of GHEX, this results in a volume in the annular area that is 12.3 times the volume in the inner pipe. In determining the volumetric pipe flow rate, the flow rate, Q, is the product of the flow velocity, V, and flow area, A, where Q=VA. In a closed GHEX system, the flow rate is the same for both the annular and inner core flow areas, $Q_a=Q_i$, therefore $V_a A_a = V_i A_i$. For the flow areas described and a unit length of GHEX, the flow velocity in the inner core area, $V_i$, is 12.3 times greater than the flow velocity in the annular area, $V_a$. Likewise, for the same length of outer and inner pipe, the residence or contact time in the outer pipe would be 12.3 times longer than the contact time in the inner pipe.

An embodiment of the outer pipe 68, containing the supply or annular flow area 46 incorporates high-density polyethylene (HDPE) in its composition. HDPE is highly durable, corrosion resistant, and when thermally-fused at connective points, the fused components are generally stronger than the original pipe section itself. HDPE can also be buried in accordance with many laws and regulations, unlike metallic components or mechanical connections, which are subject to corrosion, require periodic maintenance, and must remain accessible via a utility box. HDPE requires no maintenance and is therefore acceptable for burial without access via a utility box.

An annular flow area 46, in an embodiment, of the invention may be described as the outer flow area most proximal to the interface between the outer pipe and the earth. An annular flow area 46 in an embodiment of the invention may also be described as the area of maximum heat exchange enabled by the temperature differential between the heat transfer fluid within the outer pipe and the temperature of the earth exterior to the outer pipe. An annular flow area 46 in an embodiment of the invention may also be described as having the largest practical diameter and surface area on the external wall of the pipe to facilitate greater contact area with the surface most proximal to the surrounding earth to thereby facilitate more efficient heat exchange. An annular flow area 46 in an embodiment of the invention may also be described as the area with the greater volume of heat exchange fluid contained in the system, relative to the volume of heat exchange fluid contained in the inner core or return flow area 47, where the heat exchange fluid travels at a higher velocity. In an embodiment, the heat exchange fluid circulating within the annular flow area 46 of the outer pipe travels more slowly than the heat exchange fluid circulating within the return flow area 47 of the inner core pipe. Such a configuration facilitates less heat exchange between the annular and inner core flow areas and more efficient heat exchange with the surrounding ground mass.

The return flow rate is also enhanced by the configuration of the well head described in more detail below. The return flow comes up the riser pipe straight into an inverted reducer and then back into another reducer and then to a return pipe to the geothermal heat pump. There is no reduction in pipe diameter and no sharp turns to impede flow. The supply flow on the other hand comes through a biaxial supply line from the heat pump to an elbow, a tee, a riser pipe and then a larger outer pipe. All of these changes in pipe size, flow area, and direction slow the flow of the outward supply flow.

As mentioned, a concentric pipe GHEX system has a return or inner pipe flow area 27, 47 as shown in FIGS. 2, 4, and 6. An embodiment of the return flow area 47, as shown in FIG. 6, may have the following nominal dimensions: one (1) inch diameter inner core pipe. An embodiment of the inner core pipe 67, containing the return flow area 47, incorporates high-density polyethylene (HDPE) in its composition. A return flow 47 area in an embodiment of the invention may be described as the inner flow area contained within a smaller inner core pipe 67 surrounded by an outer pipe 68 of the annular flow area 46. A return flow area 47 in an embodiment of the invention may also be described as having a smaller cross-sectional area than the annular flow area 46, therefore requiring the heat exchange fluid in the return flow area 47 to travel much more quickly. Such a configuration thereby minimizes the opportunity for heat transfer between the heat exchange fluid in the return flow area 47 and the heat exchange fluid in the annular flow area 46 to interfere with the heat transfer that takes place between the heat exchange fluid in the annular flow area 46 and the mass surrounding the exterior of the outer pipe.

FIG. 2 depicts an embodiment of a geothermal heat pump system supplied by two arrays of three, closed loop, concentric pipe ground heat exchangers 28, consisting of a concentric pipe GHEX system with larger diameter outer pipes and smaller diameter inner core pipes installed down grout filled boreholes 25. In such a configuration, heat exchange occurs when a supply flow 26 heat exchange fluid is pumped down the annulus of the GHEX, between the outer and inner pipes of the GHEX, and returns back to the heat pump 21 through the inner core pipe or return flow area 27. The heat pump then uses the heat exchange fluid to heat and cool the building 22 through the HVAC system 23. In such an embodiment, the concentric pipe GHEX provides greater surface area along the outer pipe, greater exchange fluid volume within the system, and a longer contact time between the heat exchange fluid and the surrounding masses than previously known systems.

The FIG. 2 configurations allow for boreholes 25 as shallow as 50 feet (11 m) deep to be used for the concentric pipe GHEX system. These boreholes can be drilled vertically or at angles (such as the angles depicted in FIG. 2) to accommodate sites with less available surface area to work within.

An embodiment of the invention incorporates a reduced length borehole 25 as in FIG. 2. A reduced length borehole in an embodiment of the invention is described as the minimum length of borehole drilled into the earth to contain the concentric pipe GHEX system. An embodiment of the reduced length borehole 25 may have the following dimensions: six (6) inches in diameter and as little as fifty (50) feet in length. A reduced length borehole in an embodiment of the invention, an example of which is depicted in FIG. 2, is also described as being shallower than boreholes utilized with conventional geothermal heating systems. A reduced length borehole associated with embodiments of the invention is able to be installed at a much-reduced cost per foot of borehole as compared to conventional geothermal systems. A reduced length borehole is also greatly more cost efficient per foot as compared to conventional geothermal systems, due to the reduced length. A reduced length borehole in an embodiment of the invention may also be described as generally quicker to drill, due to the reduced length and depth requirements. A reduced length borehole may also be described as able to be drilled in smaller areas otherwise not accessible to the larger scale drilling equipment required to install conventional GHEX systems. A reduced length borehole may also be described as being either vertically bored or angle bored to allow for the maximum flexibility in effectively utilizing available work area and the maximum available heat exchange areas to the outer boundaries of a plot of property.

Embodiments incorporate an angle borehole. An angle borehole, examples of which are depicted in FIG. 2, may be described as a borehole drilled into the earth at an angle to contain the concentric pipe GHEX system. In an embodiment, a plurality of angle boreholes are configured as depicted in FIG. 2. An angle borehole in an embodiment of the invention may also be described as being drilled into the earth at any angle, as much as 90 degrees from vertical. An angle borehole is able to be installed from a much-reduced work area as compared to conventional geothermal systems. One embodiment of the angle borehole comprises an array of several boreholes drilled from the same location at various angles and directions to allow a reduced number of surface pits or trenches needed to connect the GHEX systems to the GHP and HVAC facilities associated with a property. An embodiment of the angle borehole may also have two or more arrays of boreholes drilled from closely spaced arrays in small work areas, which are still able to reach the farthest limits of the property at depths to achieve the maximum heat exchange potential.

As referred to herein, a zone of influence in association with a borehole may be considered to be a radius from the borehole at the limits of where heat exchange takes place in a GHEX system. Beyond the zone of influence, the temperature differential between the surrounding mass and the GHEX system does not result in further heat exchange. The zone of influence can be a function of the thermal conductivity of the surrounding mass and the GHEX components, the magnitude of the temperature differential, and the duration of contact time of the heat exchange fluid. Where boreholes are placed closely together, such that the zones of influence overlap, the efficiency and total amount of heat exchange of the boreholes are reduced. Reducing any overlap between the zones of influence associated with two or more boreholes improves heat exchange efficiency.

FIGS. 4 and 6 depict a concentric pipe GHEX system, where the supply flow 46 travels through the annulus between a larger diameter outer pipe 68 and a small diameter inner core pipe 67, referred to herein as the supply or annular flow area 46. In such an embodiment, the entire concentric pipe GHEX system or loop 48 is installed in a grout filled borehole 45. The grout filled borehole 45 protects the loop 48 and increases thermal conduction between the fluid and the soil. In such an embodiment, the cross-sectional view of the concentric pipe GHEX is depicted in FIG. 6, shows the large diameter outer pipe configured to enclose the annular flow, also referred to as the outward or supply flow area 46, and the small diameter inner core pipe 67 configured to enclose the return flow, also referred to as the inner core, inner pipe, or return flow area 47. In an embodiment, the entire concentric pipe GHEX 48, as shown in FIG. 4, is installed in a grout filled borehole 45. In an embodiment, the concentric pipe GHEX connects with a concentric pipe well head 49, which provides the transition between parallel and optionally biaxial supply 46 and return 47 pipe flow, as shown in FIG. 4, and concentric or annular supply flow 46 and inner core pipe return flow 47, as shown in FIG. 6.

In an embodiment, the supply flow travels through an elbow and tee fitting and into the annular space between the outer pipe and inner core pipe. The outward flow travels down the annular space, or supply flow area 46, and returns up the inner core pipe, or return flow area 47. However, this flow may be reversed to suit different implementations. The cross-sectional view of FIG. 4 depicts an example direction of flow travel.

Figure 7:
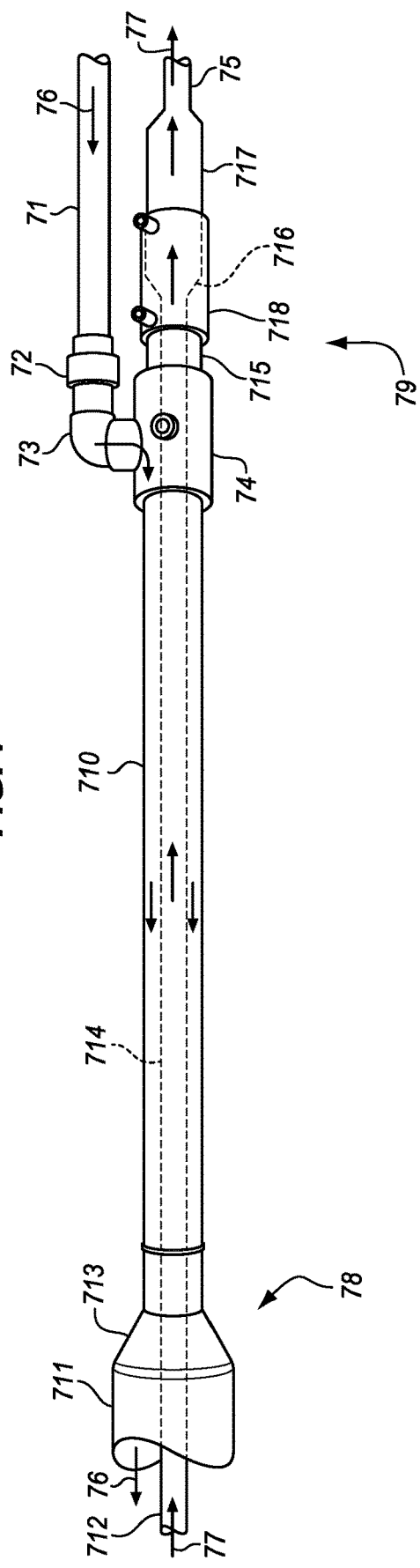
FIG. 7 is a perspective view diagram of a concentric pipe well head in an embodiment of the invention.

Referring to FIG. 7, in the illustrated embodiment a well head 79 has a supply flow pipe 71 connected through a reducer 72 to an elbow 73 and tee 74 connection located at the very bottom of the well head 79. The elbow 73 and tee 74 connects the supply flow pipe 71 at an angle perpendicular to the flow in the concentric pipe GHEX 78, at the far left in the figure. A return flow pipe 77 connects to the very top of the well head, to the right in the figure, at an angle coaxial to the flow in the concentric pipe GHEX. These are referred to as supply and return flow pipes, however the directions may be reversed so that either flow pipe may serve as the supply or as the return.

A segment of reduced diameter riser pipe 710 is placed above, to the right in the figure, of the full diameter GHEX 78. The GHEX in this example has an outer pipe 711 to contain the supply flow 76 and an inner coaxial pipe 712 to contain the return flow 77, however, the flow directions may be reversed and the relative dimensions of the pipes may be modified to suit different implementations. The outer pipe is an outer heat exchanger pipe designed to exchange heat with the earth surrounding the borehole. It is connected to a reducer 713 that connects the larger diameter outer exchanger pipe 711 to a reduced diameter riser pipe 710. The inner pipe 712 is isolated from the earth by the flow area of the outer pipe 711. The inner pipe 712 is connected to a reduced diameter inner core pipe of the riser 714. Alternatively, the inner pipe of the GHEX may continue through the riser, shown as the dashed or hidden line in FIG. 7. The riser pipe 710 continues to the tee fitting 74. The tee 74 is connected to the riser pipe extension 715.

The inner core pipe 712 of the riser pipe 714 continues through the tee 74 and through the riser pipe extension 715, as shown by the dashed or hidden line in FIG. 7, where it connects to an inverted reducer 716 coupled to a second reducer 717 that is coupled to the return flow pipe 75. As a result, the supply flow pipe 71 extending from the tee 74 and elbow 73 is parallel to and offset from or biaxial to the return flow pipe 75.

The riser pipe extension 715 is coupled to the outside of the inverted reducer 716 using an outer coupling 718. The outer surfaces of the inverted reducer 716 and riser pipe extension 715 are fused to the inner surface of the outer coupling 718. These fusion connections allow all of the illustrated components to be rigidly attached together to secure the positions of the inner and outer pipes of the concentric pipe GHEX. In addition, the outer surface of the inverted reducer above the inner core pipe seals the supply flow area of the concentric riser pipe. This forces flow downhole from the well head without any other complex cap or seal to the down flow pipe.

As shown, the well head connections for the supply flow 76 and return flow 77 are offset along the reduced diameter riser pipe 710 and riser pipe extension 715. This offset, combined with the alignment of the connections and the reduced diameter and flexibility of the riser pipe, allows the well head to be placed within a hole having the same diameter as the borehole drilled for the GHEX. The well head alignment and configuration also allow the GHEX borehole to be drilled at any angle in the subsurface with no additional connections or fittings required.

Figure 8:
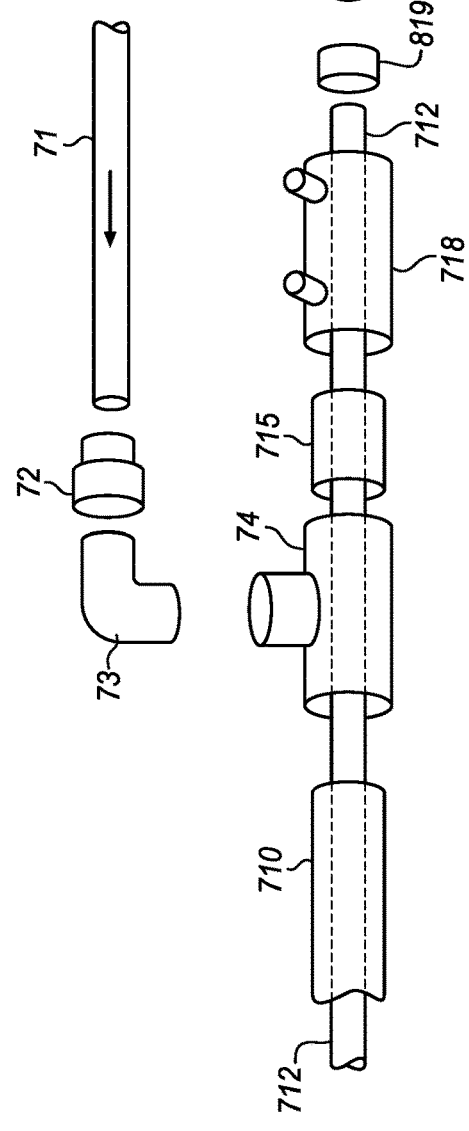
FIG. 8 is an exploded view diagram of the concentric pipe well head as shown in FIG. 7, showing the arrangement of fittings prior to joining the fittings.

An exploded view of an example concentric pipe well head is depicted by FIG. 8 in which the GHEX and borehole is to the left of the drawing figure and the top of the well is on the right side. More precisely, in an embodiment, supply flow through the supply flow pipe 71, flows through a reducer 72, elbow 73, and tee 74, then down the annular area between the inner core pipe 712 and the riser pipe 710, then down the annular area of the concentric pipe GHEX on the left side of the figure. Return flow through the inner core pipe 712 is coupled through the wellhead at the outer coupling 718 and exits the wellhead to the return flow pipe 75, which is coupled to the heat pump on the right side of the figure.

The transition from concentric pipes 710, 712 to parallel, biaxial, supply and return pipes 71, 75 is facilitated by and routed through two coupled reducer fittings 716, 717 where one reducer fitting 716 is inverted and the small end facing the borehole is connected by thermal socket fusion to the small diameter inner core pipe 712 from the GHEX using an inner coupling 819. Thermal butt fusion can also be used for this connection. The large end of the inverted reducer 716 facing the heat pump is connected by thermal butt fusion to the large end of the second reducer 717 that is then connected using a socket fusion coupling 820 at the opposite end facing the top of the well to the small diameter return flow pipe 75 exiting the well. The lower reducer fitting 716 and the riser pipe extension 715 are placed within the outer coupling 718 and the three fittings are fused together using electrofusion.

The outer pipe 710 of the riser is coupled to a tee fitting 74 on the side opposite the heat exchanger. The tee fitting is coupled to the outer coupler 718 using electrofusion with a riser pipe extension 715 between the tee fitting 74 and the outer coupler 718. At the opposite side of the outer coupler 718, the outside of the large end of the inverted reducer 716 is connected by thermal fusion to the inside of the outer coupler 718. The small end of the inverted reducer 716 is connected to the inner core pipe 712 using the upper inner coupler 819.

In this embodiment of the concentric pipe wellhead, the elbow 73 and tee fittings 74 transition the supply flow from the GHP to the annular flow area inside the riser pipe 710. The two coupled reducer fittings 716, 717 transition the inner core return flow from the concentric pipe wellhead to the return flow pipe 75, returning the flow to the GHP. One embodiment of the concentric pipe wellhead may have the following nominal dimensions: one (1) inch diameter supply flow pipe 71, one-and-one-quarter-inch-by-one-inch (1¼×1) reducer coupling 72, one-and-one-quarter (1¼) inch elbow fitting 73, two-inch-by-two-inch-by-one-and-one-quarter (2×2×1¼) inch tee fitting 74, two (2) inch diameter riser pipe 710, one (1) inch diameter inner core pipe 712, two (2) inch diameter riser pipe extension 715, two (2) inch diameter outer coupling 718, one (1) inch inner coupling 819, inverted two-inch-by-one-inch (2×1) reducer coupling 716, two-inch-by-one-inch (2×1) reducer coupling 717, one (1) inch coupling 820, one (1) inch diameter return flow pipe 75.

The concentric pipe wellhead may have high-density polyethylene (HDPE) in its composition for all components. However any of a plurality of other suitable plastic and composite materials may be used instead. Thermal fusion may be used for connection of all components. Butt fusion and electrofusion may be used for some or all of the connections. Specific fusion methods are suggested for particular connections herein, however, different fusion methods may be preferred at particular joints or connections for particular implementations. Socket fusion methods may be used for the supply flow pipe, elbow fitting, tee fitting, inner core pipe, small ends of reducer couplings and return flow pipe. Butt fusion methods may be used for the large ends of the reducer couplings, inner core pipe, and return flow pipe. Sidewall fusion may be used in place of the tee fitting. A 45 degree elbow and wye (Y) fitting may be used in place of the elbow and tee fittings. Other types of fittings may be used instead of the elbow to transition the coaxial flow to a compact biaxial flow. The elbow and tee fittings in the illustrated embodiment may act as a stop for a push rod that is used during installation and to stabilize the GHEX during grouting.

The riser pipe 710 and riser pipe extension 715 may incorporate high-density polyethylene (HDPE) in its composition. An embodiment of the riser pipe 710 and riser pipe extension 715 may have the following nominal dimensions: two (2) inch diameter riser pipe. Thermal fusion may be used for connection of all components. Butt fusion methods may be used for connection of the GHEX 78 larger diameter outer pipe 711 and reducer coupling 713 below the riser pipe 710 shown of FIG. 7. Socket fusion methods may be used to connect the tee fitting 74 to the top of the riser pipe 710 and the riser pipe extension 715.

Referring to FIG. 7, the riser pipe 710 and riser pipe extension 715 allow offset of the elbow 73 and tee 74 fittings along the riser pipe above the GHEX 78 so the wellhead 79 fits in the borehole. The borehole can be drilled as shown with a constant radius up to the top of the borehole and yet the flow pipe attached to the elbow fit within this hole. The riser pipe also provides for a faster moving heat exchange fluid through the area at the top of the borehole where there is overlap in the zone of influence associated with the heat exchange at the top of an array of angled boreholes.

Figure 9:
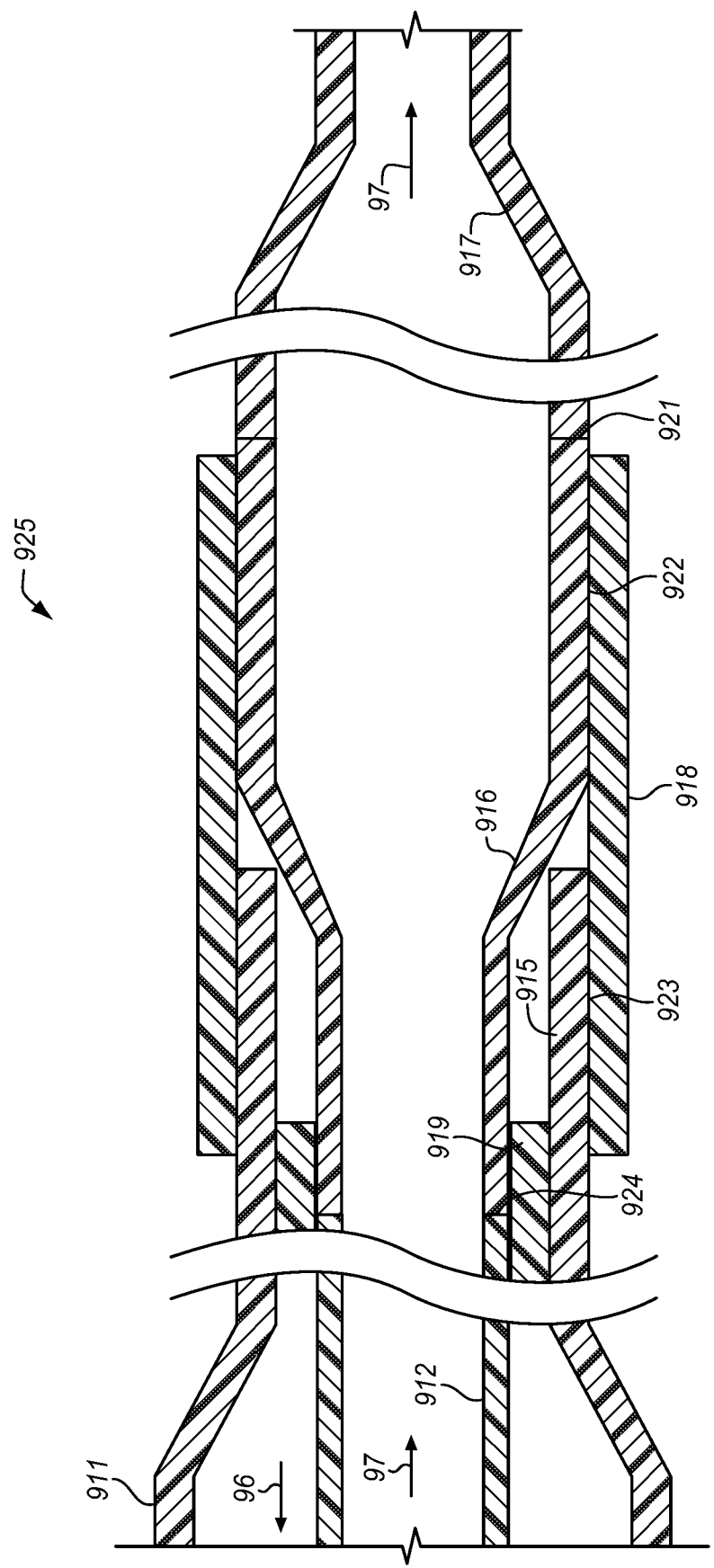
FIG. 9 is a cross-section view diagram of an interconnected portion of the concentric pipe well head as shown in FIG. 7, showing different heat fusion pipe joining methods in an embodiment of the invention.

Referring to FIG. 9, an embodiment of the coupled reducer fittings 916, 917, incorporates high-density polyethylene (HDPE) in its composition. An embodiment of the coupled reducer fittings incorporates thermal fusion 921, 922, 923, 924 for connection of all components. Butt fusion methods 921 may be used to join the large ends the reducer couplings 916, 917 together. Socket fusion methods 924 may be used for connection of the inverted reducer 916 to the inner core pipe 912 using the inner coupling 919. Electrofusion methods 922, 923, may be used to connect the outer coupling 918 to the inverted reducer coupling 916 and to the riser pipe extension 915 providing a transition of the flow across the annular supply flow area of the GHEX 96 and into the biaxial return flow area 97 at the top of the well head 925.

FIG. 9 shows an example arrangement of pipes and fittings and a sequence and method of sequentially interconnecting the outer supply and inner return pipes of the GHEX within the interconnected portion of the well head 925. In one example sequence, as shown in FIG. 8, a segment of supply flow pipe 71, a reducer coupling 72, an elbow 73, a tee 74, a riser pipe 710, and riser pipe extension 715, are first joined using socket fusion. The supply flow pipe 71 is coupled to the reducer coupling 72, which is coupled to the elbow 73, which is coupled to the tee 74. The riser pipe 710 is coupled to the GHEX to the left of the figure and to the tee 74 on the side opposite the GHEX. The riser pipe extension 715 is coupled to the tee 74 on the side opposite the riser pipe 710.

Next, as shown in FIG. 9, the large ends of two, 2×1, reducer couplings 916, 917 are joined together using butt fusion 921. Next the lower, small end of the joined reducer couplings 916 is joined to the GHEX inner core pipe 912 using an inner coupling 919 and socket fusion 924. Next the lower end of an electrofusion outer coupling 918 is placed over the top the riser pipe extension 915. Next the inner core pipe 912, joined reducer couplings 916, 917 and return flow pipe 97, are inserted down through the outer electrofusion coupling 918, the riser pipe extension 915, tee 74 (as shown on FIG. 8), riser pipe 710 (as shown on FIG. 8), and GHEX outer casing 911, until the lower end of the joined reducer couplings 916 stops inside the upper end of the electrofusion outer coupling 918. Finally, the electrofusion outer coupling 918 is used to simultaneously join the outer supply and inner return flow areas of the GHEX 96, 97 and transition the flow from concentric pipes 911, 912 to parallel, biaxial, supply and return pipes 71, 75 (as shown in FIG. 8).

As mentioned above, the concentric pipe well head may be assembled entirely of high-density polyethylene (HDPE) using common pipe and fittings with all connections joined by heat fusion joining methods, allowing the well head to be constructed in the field. An example of nominal fitting dimensions follows, from top to bottom as shown in FIG. 7: Along the fluid supply flow side 76, a one (1) inch diameter supply flow pipe 71, connected to a one-and-one-quarter-by-one-inch-(1¼×1) reducer coupling 72, connected to a one-and-one-quarter (1¼) inch elbow fitting 73, connected to a two-inch-by-two-inch-by-one-and-one-quarter (2×2×1¼) inch tee fitting 74, connected to a two-(2) inch riser pipe 710, connected to a four-inch-by-two-inch (4×2) reducer coupling 713, connected to a four (4) inch full diameter GHEX outer pipe 711. The four (4) inch full diameter GHEX outer pipe diameter provides an optimal pipe diameter for installation in a practical borehole diameter of six (6) inches.

Along the fluid return flow side 77, a one (1) inch diameter return flow pipe 75, connected to a two-inch-by-one-inch (2×1) reducer coupling 717, connected to an inverted two-inch-by-one-inch (2×1) reducer coupling 716, connected to a one (1) inch inner core pipe, 714 in the riser pipe, 712 in full diameter GHEX. The joined reducer couplings effectively increase the diameter of the inner core pipe to match the outer riser pipe extension 715 diameter over a short distance. This allows the outer supply and inner core return pipes of the GHEX to be simultaneously interconnected, within the interconnected portion of the well head 79, by a two (2) inch electrofusion outer coupling 718. The necessary well head fittings may be assembled in the field using a specific sequence of different heat fusion joining methods to construct the well head.

Considering these dimensions, the GHEX outer pipe has an inner radius of 2 inches. The riser pipe has a 1 inch radius. The supply flow pipe has a ½ inch radius. This leaves ½ inch for the ⅝ inch radius elbow to separate the flow pipe from the riser and yet require no more room in the borehole than the GHEX outer pipe. A typical elbow extends no more than about a radius of the pipe to which it connects so that such an elbow and flow pipe will fit within a 1 inch distance from the riser pipe to the outer or distal side of the flow pipe. A typical borehole is also drilled larger than the GHEX to accommodate grout between the GHEX and the soil and so there is an additional inch or two within the borehole around the GHEX. This additional inch or two allows for a larger elbow and a larger flow pipe without drilling an additional larger section for the well head.

FIG. 9 shows some of the well head connections described above in cross-section after the parts of FIG. 8 are assembled to obtain the structure of FIG. 7. As mentioned, the inner and outer pipes of the GHEX may be simultaneously interconnected. The large ends of the two reducer couplings 916, 917 may be joined using butt fusion 921. Next the lower end of the joined reducer couplings (left side of the figure) is joined, using socket fusion 924 and inner coupling 919, to the inner core pipe 912 that leads through the riser pipe extension 915, tee, and riser pipe (not shown), to the GHEX (left of the figure). Before the inner core pipe 912, inner coupling 919, and joined reducer couplings 916, 917 are inserted down the GHEX, the lower end of the electrofusion outer coupling 918 is placed over the top of the riser pipe extension 915. Then the inner core pipe 912, inner coupling 919, and lower end of the joined reducer couplings (which has the same outer diameter as the riser pipe extension 915) is inserted into the electrofusion outer coupling 918 until the lower end of the joined reducer couplings stops inside the upper end of the electrofusion outer coupling 918. Finally, the electrofusion outer coupling 918 is used to simultaneously join the outer supply 923 and inner core return 922 pipes of the GHEX with an electrofusion coupling 918.

Alternately, the well head 79, shown of FIG. 7, may be configured using injection molding to manufacture some or all portions of the well head, allowing more economical mass production, but still allowing assembly in the field. Alternative embodiments of the well head will have varying dimensions to accommodate the design of the borehole GHEX, including varying depths and diameters of the borehole, inner, and outer GHEX pipe, and varying thermal properties of the earth surrounding the borehole, the borehole grout, and the outer and inner GHEX pipe.

Figure 10:
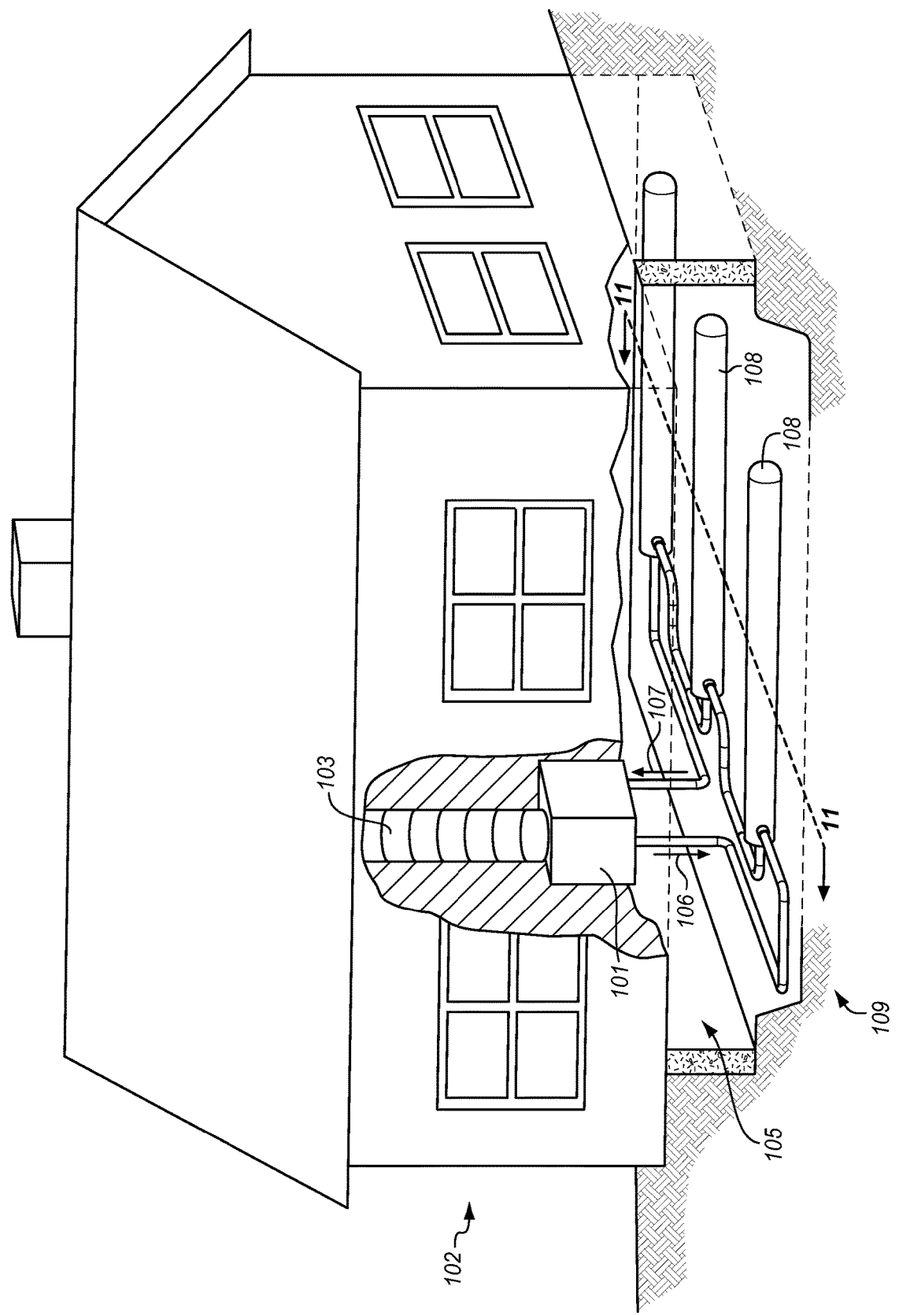
FIG. 10 is a schematic front elevation view diagram, partially cut-away, of a concentric pipe configuration installed horizontally in a crawl space beneath the footprint of a building in an embodiment of the invention.

An alternate concentric pipe GHEX installation is shown in FIG. 10. A building 102 has a GHP 101, with the heat pump connected supply flow 106 and return flow 107 pipes connected to a plurality of horizontally installed, closed-loop, concentric pipe GHEX systems 108. This embodiment of the well head 109 shows the GHEX systems installed horizontally within a trench in the crawl space 105 beneath the footprint of the building. Because of the close proximity of the pipes in the trench, smaller pipes may optionally be used for the GHEX, with the outer pipe having the same diameter as the well head riser pipe. This still results in the annular flow area being 1.74 times the inner core pipe flow area. To increase the contact time of the heat exchange fluid in the smaller diameter concentric pipe GHEX installations, the well heads may be installed in series, as compared to installation in parallel for the borehole GHEX systems.

The horizontal configuration shown in FIG. 10 allows the concentric pipe GHEX installation to supplement external borehole GHEX installations, where site constraints won't allow sufficient exterior borehole GHEX installations, where borehole installations are not possible or less practical, where access is limited or required external space not available or prohibitively constrained, or for retrofit projects to supplement existing HVAC systems.

Where horizontally installed, concentric pipe GHEX systems are installed outside the building, where there are no space limitations, the concentric pipe GHEX system can use much larger outer pipes, riser pipes, and concentric pipe well head fittings to increase the heat exchange capacity of the system.

Figure 11:
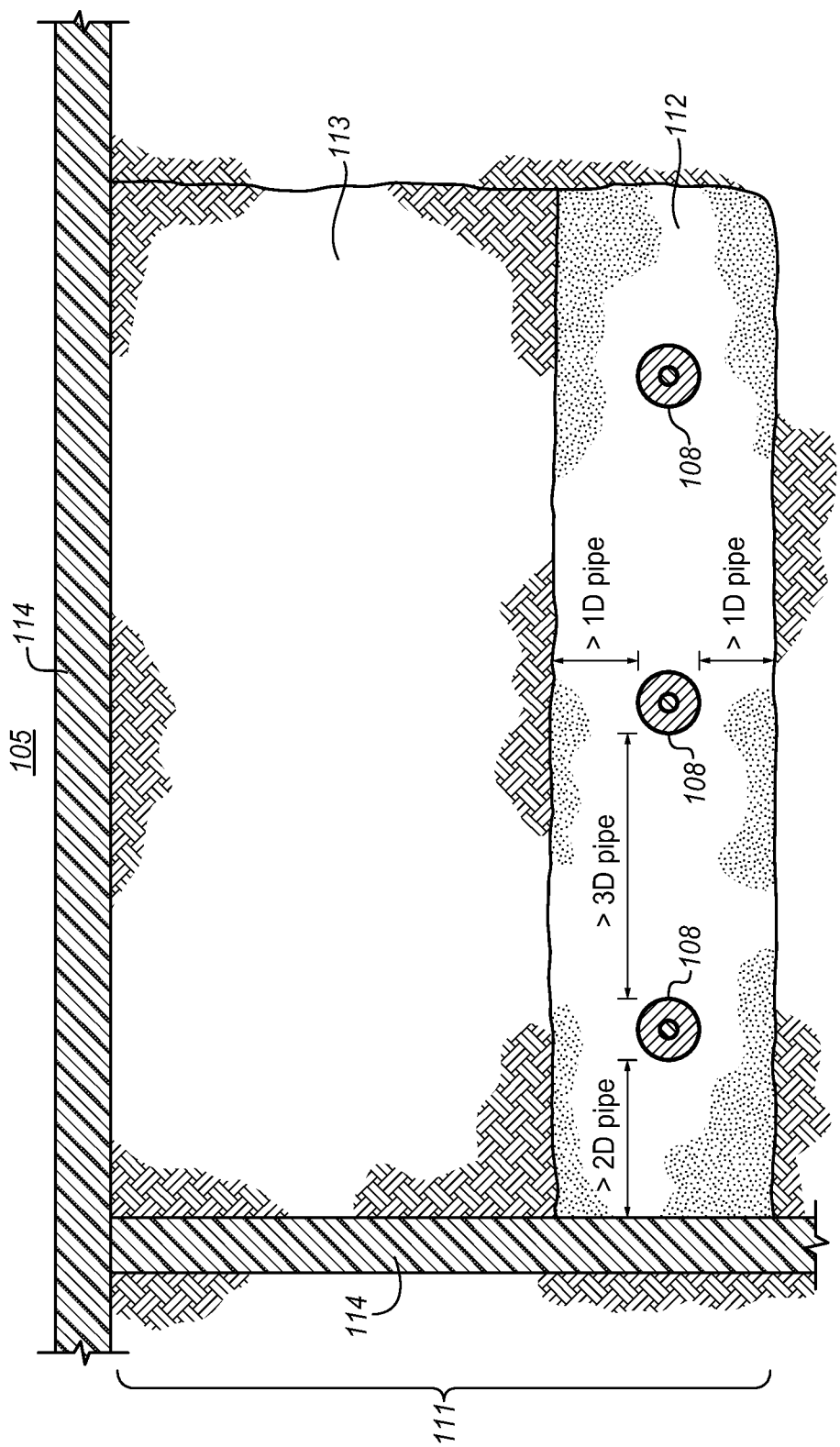
FIG. 11 is a side cross-section view diagram of the horizontal trench installed concentric pipe ground heat exchanger taken along line 11-11 as shown in FIG. 10.

FIG. 11 is a side cross-section view of a horizontally installed, closed-loop, concentric pipe GHEX system taken along line 11-11 of FIG. 10. Three concentric pipe GHEX systems 108 are installed in a trench 111 within a crawl space 105 beneath a building footprint, similar to the isometric partially cut away view of FIG. 10.

In some installations, smaller pipes may optionally be used to facilitate the geothermal heat exchange, with the outer pipe of the GHEX having the same diameter as the well head riser pipe. A smaller diameter outer pipe in the GHEX results in a reduced surface area for heat exchange. The effective surface area for heat exchange in the trench is increased by embedding the ground heat exchanger pipes in a thermally enhanced (TE) pipe bedding 112 comprised of a mixture of quartz sand, aluminum oxide (alumina), and carbon powder or graphite.

To optimize the heat transfer between the parallel pipes in the trench and the surrounding ground, the TE bedding may optionally be configured to extend a minimum distance of two pipe diameters laterally beyond the pipes on the trench sides, one pipe diameter above and one pipe diameter below the pipes and three pipe diameters between the pipes. The remainder of the trench may be backfilled using backfill materials 113 excavated from the trench 111 or obtained in another way. Where the concentric pipe GHEX systems cannot be placed a minimum distance of 5 feet (2.4 m) from the ground surface or from the building foundation, the system may be insulated with extruded polystyrene sheets 114, placed at a thickness having an equivalent R-value to the required thickness of adjacent soil.

A TE pipe bedding mixture may be predominantly medium to fine grained quartz sand. Open voids or porosity in the quartz sand may be filled with smaller, very fine-grained sand to silt sized alumina particles, having a thermal conductivity 10 times greater than the quartz sand. The remaining voids in the TE bedding can be filled with silt and clay sized particles such as carbon powder, graphite, or graphene having thermal conductivity values more than 60 times greater than the alumina. The optimum mixture of the TE bedding, considering both economy and thermal conductivity, depends on the grain size distributions of the different components. The optimum grain size distributions of the quartz and alumina will ensure the D85 (grainsize at which 85 percent of the gradation particles are smaller) of the alumina is smaller than the D15 of the quartz sand, but not less than 9 times the D85 of the alumina, or 0.2 mm. This optimizes the filling of voids in the quartz sand while preventing the alumina from washing through the quartz sand.

An optimum mixture of quartz and alumina may be determined by measuring the density of the mixture at different mix percentages (by weight) of alumina in quartz sand. As alumina is first added to the mixture, the mixture density quickly increases. As the percentage of alumina in the mixture increases, the rate of increase of the mixture density begins to slow or decrease, indicating the alumina has filled the available pore spaces in the quartz sand. This indicates that an optimum amount of alumina has been reached. In some embodiments, the optimum proportion of alumina in the mixture is generally 15 to 20 percent, by weight. The remaining air voids in the mixture can be filled with carbon powder or graphite.

In an embodiment of the invention, following the drilling of a borehole, and the subsequent placement of pipe and other components comprising the well, or closed-loop GHEX, a void exists between the outer barrier of the borehole and the outer surfaces of the pipe, other components and/or the GHEX. Borehole grout may be placed within this void to seal the borehole. The borehole grout may include sand, bentonite clay, and water, proportioned such that it can be pumped into the void as a fluid and subsequently transition into a solid state. In an embodiment, the borehole grout seals while allowing for thermal conductivity. An embodiment of the invention incorporates a specially constructed borehole grout that presents high thermal conductivity characteristics. In such an embodiment, the borehole grout forms a continuous bond between the GHEX pipe and the surrounding mass. This mass exhibits a low permeability to prevent water movement through the grout within and/or along the borehole.

In some applications, the borehole grout includes bentonite. Montmorillonite clay may be a principal active ingredient of the borehole grout. Silica sand may be included as an additive and may serve to enhance the thermal conductivity of the borehole grout by as much as 200 percent. The amount of silica sand additive may depend on the characteristics of the clay and be limited by the viscosity of the mixture and the ability to pump the borehole grout. Aluminum oxide may also be used as an additive. Aluminum oxide may have a thermal conductivity approximately ten times greater than silica sand. As such, aluminum oxide further enhances the thermal conductivity of the borehole grout. In some cases, a smaller grain size may be used with aluminum oxide to present less adverse impact on the viscosity of the borehole grout when the grout is delivered via pumping.

The described geothermal systems may be combined with solar energy systems, where the solar generated electricity and new battery technology are used to power the GHP. The more efficient GHEX system is used to heat and cool the building more economically and with minimal impact on the environment.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The terms "coupled" and "linked" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence [Several paragraphs are used for this description].

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A well head interconnecting a concentric pipe ground heat exchanger to a geothermal heat pump, the geothermal heat pump having biaxially-arranged supply and a return flow pipes, wherein the supply flow pipe is biaxially-arranged relative to the concentric pipe ground heat exchanger with the return flow pipe coaxially-arranged, the concentric pipe ground heat exchanger having an outer heat exchanger pipe configured to convey a heat exchange fluid in a first direction and an coaxially arranged inner heat exchanger pipe configured to convey the heat exchange fluid in a second direction, the outer heat exchanger pipe having a first radius, which is associated with a borehole radius of the heat exchanger, and the inner heat exchanger pipe having a second radius, wherein the second radius is smaller than the first radius, the well head comprising:
    an outer riser pipe of a third radius smaller than the first radius and larger than the second radius;
    an inner riser pipe fluidically interconnected to the inner heat exchanger pipe;
    a first reducer fluidically interconnected to the outer heat exchanger pipe on one end and to the outer riser pipe on an opposite end;
    a second reducer coupled to the outer riser pipe and fluidically interconnected to the inner riser pipe on one end and to a third reducer on an opposite end, the third reducer fluidically interconnected to the return flow pipe of the geothermal heat pump; and
    an elbow fluidically interconnected to the outer riser pipe on one end and to the supply flow pipe of the geothermal heat pump on an opposite end, wherein a distance from the center of the outer riser pipe to a distal side of the elbow is not greater than the first radius.

2. The well head of claim 1, further comprising a tee or wye fitting connecting the elbow to the outer riser pipe.

3. The well head of claim 1, wherein a smaller end of the second reducer is fluidically interconnected to the inner riser pipe by thermal fusion at an inner coupling, wherein a larger end of the second reducer is coupled to the outer riser pipe to an outer coupling by thermal fusion, and wherein the larger end of the second reducer is connected to a larger end of the third reducer by thermal fusion.

4. The well head of claim 3, wherein the inner riser pipe and the return flow pipe have radii equal to the radii of the smaller ends of the second and third reducers, and wherein the larger ends of the second and third reducers have radii equal to the third radius of the outer riser pipe.

5. The well head of claim 1, wherein the inner and outer heat exchanger pipes of the concentric pipe ground heat exchanger, the supply flow pipe and return flow pipe of the geothermal heat pump are thermally fused to fittings that are also thermally fused to the inner and outer riser pipes.

6. The well head of claim 5, wherein the inner and outer riser pipes are flexible to allow bending during installation.

7. The well head of claim 3, further comprising a tee fitting positioned between the outer riser pipe and a riser pipe extension located adjacent to the outer coupling, the riser pipe extension having a radius equal to the third radius of the outer riser pipe, and wherein the outer riser pipe and inner riser pipe are made of polyethylene (PE).

* * * * *